June 26, 1928.  C. H. DESAUTELS  1,674,767
WIRE COVERING DEVICE
Filed Jan. 15, 1924    3 Sheets-Sheet 1

INVENTOR.
Charles H. Desautels
BY
Edward C. Taylor
ATTORNEY.

June 26, 1928.
C. H. DESAUTELS
WIRE COVERING DEVICE
Filed Jan. 15, 1924    3 Sheets-Sheet 2
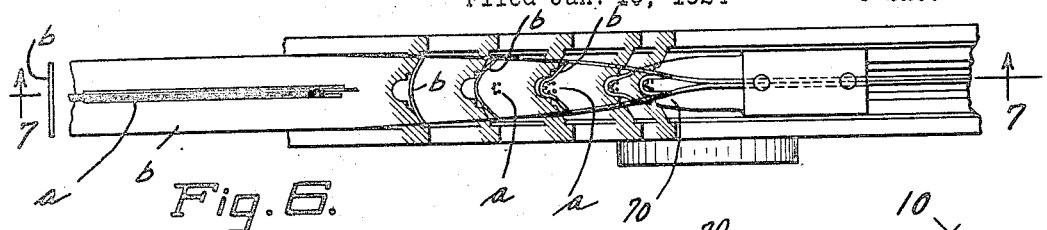
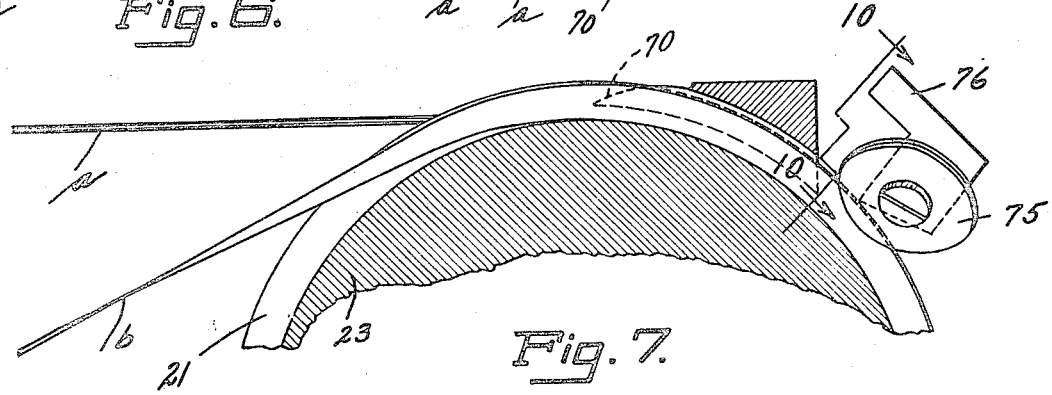
Fig. 6.
Fig. 7.
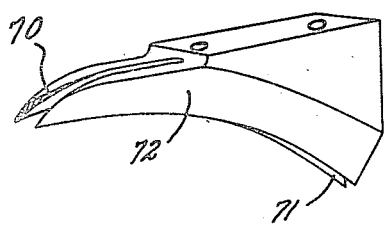
Fig. 8.
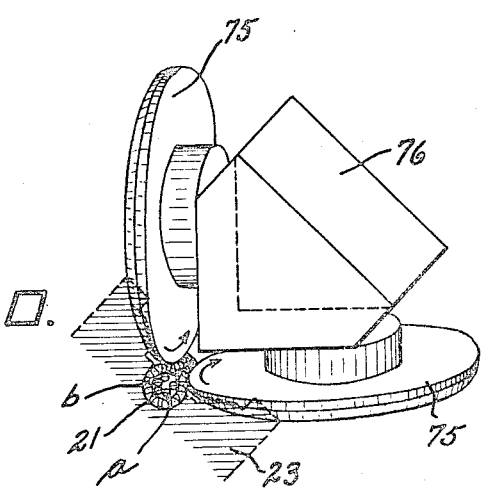
Fig. 10.
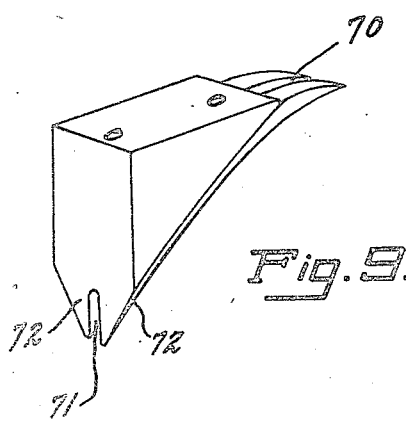
Fig. 9.
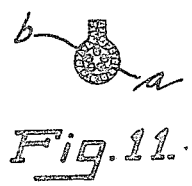
Fig. 11.
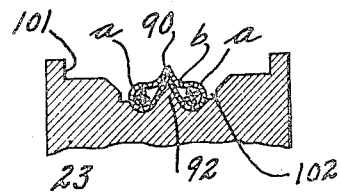
Fig. 13.
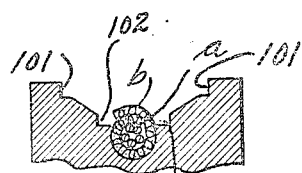
Fig. 12.
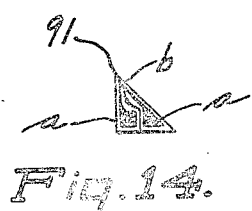
Fig. 14.
INVENTOR.
Charles H. Desautels
BY
Edward C. Taylor
ATTORNEY.

June 26, 1928.
C. H. DESAUTELS
1,674,767
WIRE COVERING DEVICE
Filed Jan. 15, 1924
3 Sheets-Sheet 3
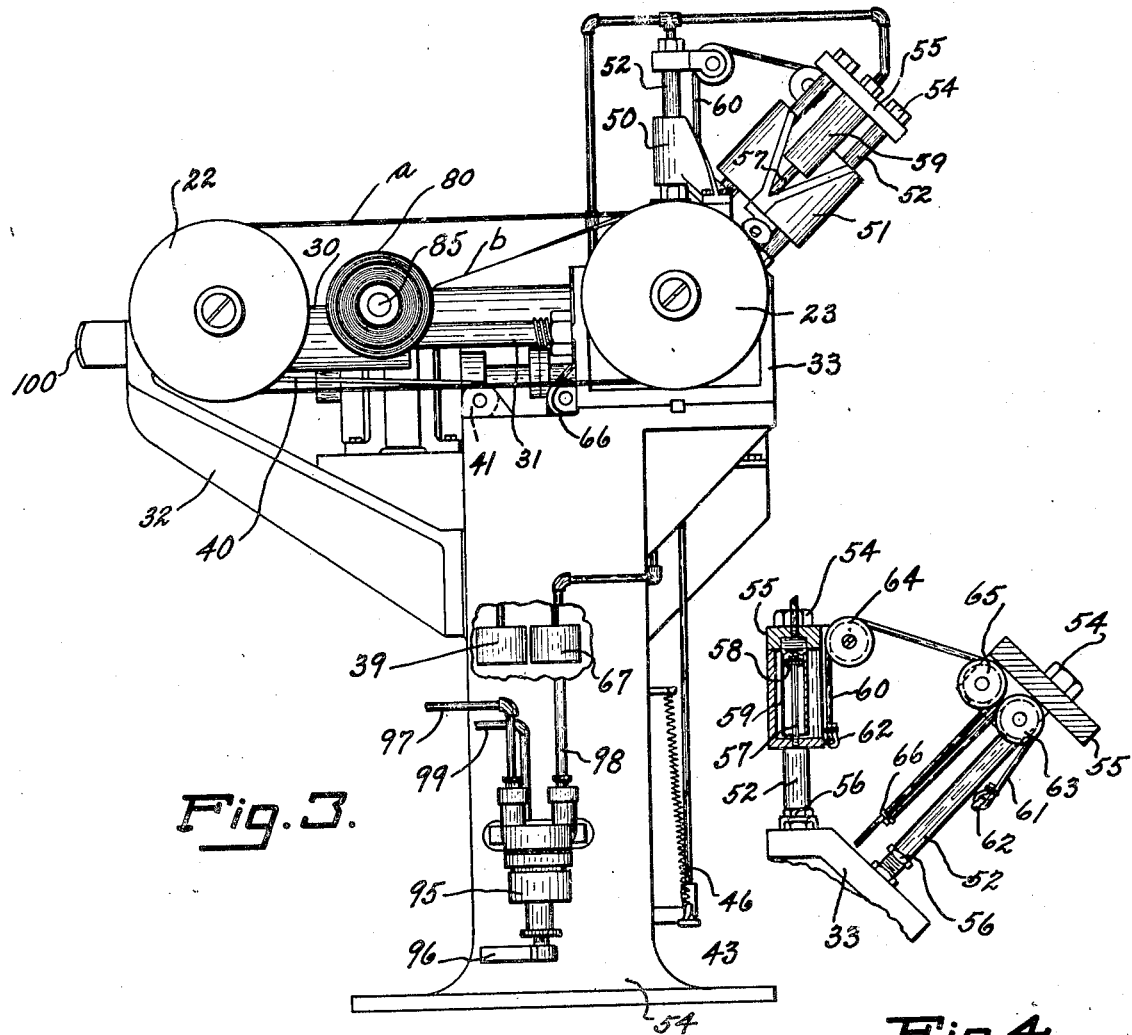
Fig.3.
Fig.4.
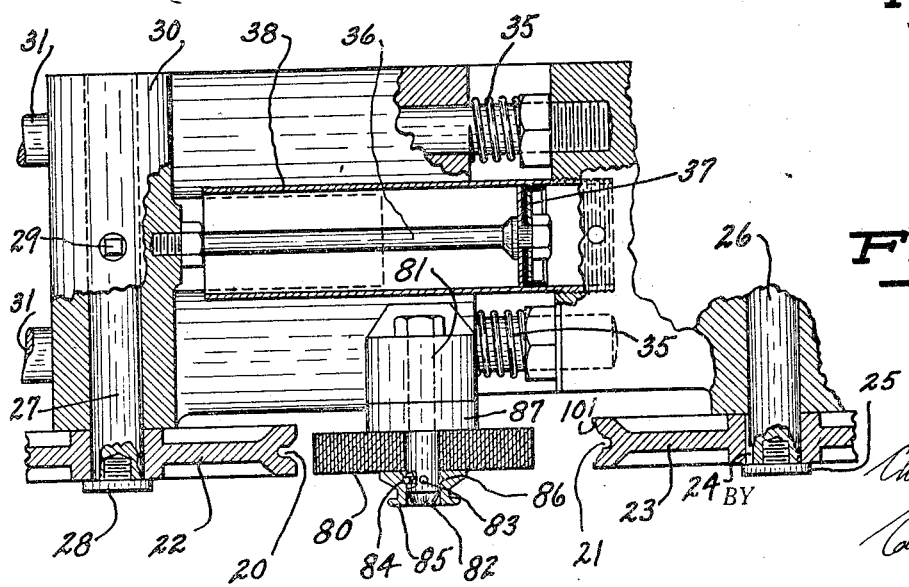
Fig.5.
INVENTOR.
Charles H. Desautels
BY
Edward C. Taylor
ATTORNEY.

Patented June 26, 1928.

1,674,767

UNITED STATES PATENT OFFICE.

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

WIRE-COVERING DEVICE.

Application filed January 15, 1924. Serial No. 686,440.

This invention relates to apparatus designed to cover endless rings with strips of adhesive material. The particular task for which the machine is intended is the covering with rubberized fabric of the cabled or bundled wire hoops used as bead reinforcements in the manufacture of automobile tire casings. The manner in which the several objects of economy, accuracy, and speed in operation are accomplished will appear from the following description.

Referring now to the drawings,

Fig. 3 is a front elevation of the machine in operation;

Fig. 4 is a detail section on line 4—4 of Fig. 1;

Fig. 5 is a detail plan of a portion of the mechanism, partially broken away;

Fig. 6 is an enlarged plan showing the passage of the hoop and fabric through the folding device, showing also in interspersed sections the progression of the folding operation;

Fig. 7 is a section on line 7—7 of Fig. 6, showing in addition the final pressing rolls;

Figs. 8 and 9 are perspectives of a folder;

Fig. 10 is a view on line 10—10 of Fig. 7, illustrating the action of the final pressing rollers;

Fig. 11 is a detail section of the product of the machine;

Fig. 12 is a detail section similar to a portion of Fig. 10, but showing a modification;

Fig. 13 is a similar detail section showing a second modification; and

Fig. 14 is a detail section of the final product made from the wires covered according to the second modification.

Figure 2:
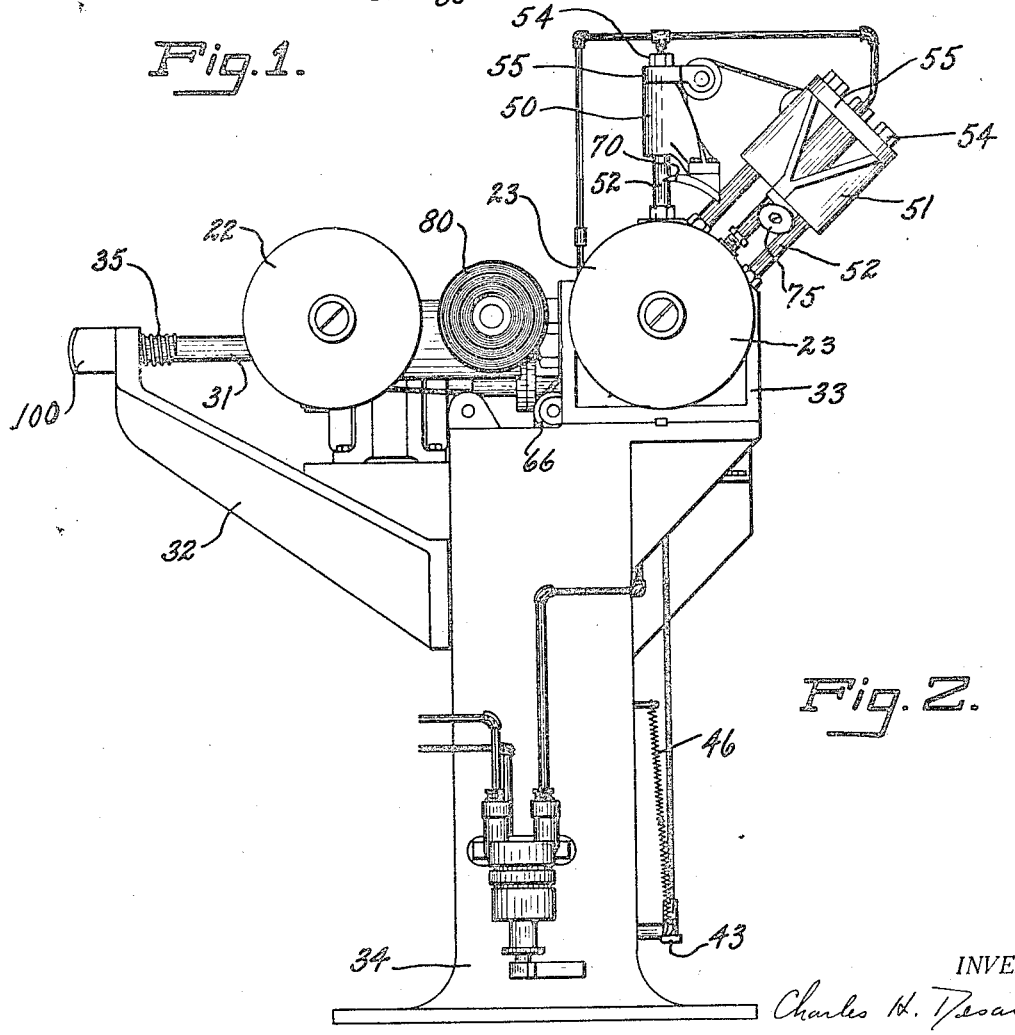
Fig. 2 is a front elevation with the machine idle.

The machine is designed to receive a coil, cable, or hoop of wire $a$ (Fig. 3) which is to be covered with a strip of rubberized fabric $b$. This wire hoop is received in grooves 20 and 21 in pulleys 22 and 23 respectively (Fig. 5). Pulley 23 is mounted, as by a key 24 and a locking stud 25, on a driving shaft 26, which receives rotary motion from a source to be described. Pulley 22 is mounted for free rotation on a shaft 27, being held in place by a stud 28. Shaft 27 is fixed as by a set screw 29 to a carriage 30 sliding on rods 31 suitably fixed in brackets 32 and 33 mounted on the main frame 34 of the machine. At each end of the rods they are preferably loosely encircled by coiled springs 35 acting as bumpers to check the carriage in its reciprocation. A piston rod 36 is secured to the carriage, and has a piston 37 thereon running in a pneumatic cylinder 38. On the admission of air to the head of the cylinder the carriage will be moved along its guide rods so as to separate the pulleys with an elastic pressure, thus drawing the hoop $a$ tight as shown in Fig. 3. Return of the carriage to the normal position of Fig. 2 is accomplished by a weight 39 (Fig. 3) connected to the carriage by a cord 40 passing over a pulley 41 on the frame.

Figure 1:
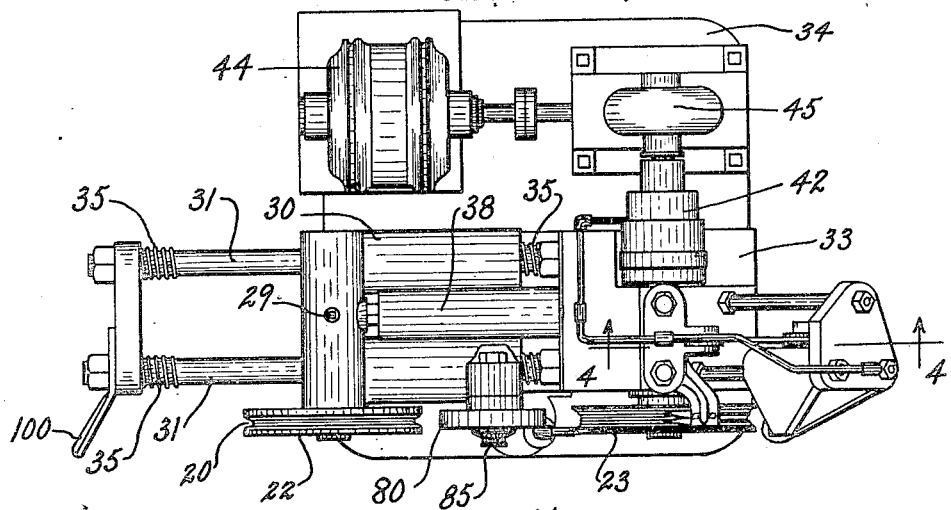
Fig. 1 is a plan of the machine.

Rotation of the driven shaft 26 may be controlled by any suitable clutch mechanism, indicated generically at 42 in Fig. 1 and controlled by a foot treadle 43. The clutch may be of any standard type, and has not for this reason been shown in detail. The constantly driven member of the clutch is connected to a motor 44 by a reduction gear mechanism which, as it may also be of any standard type, has been indicated generically only by the numeral 45. The motor is operated steadily while the machine is in use, stoppages for placing the work in the machine being controlled by the clutch treadle. For convenience this treadle is held by a spring 46 in a position to keep the clutch disengaged, engagement being accomplished by a pressure of the operator's foot.

The idle pulley 22 may have a plain groove, but is preferably made with slanting sides which act as guides for locating the wires in the groove. The driven pulley 23, however, is preferably made with stepped-off and slanting sides to the groove, as is shown in Figs. 5 and 6, permitting the fabric to be drawn gradually into the groove. The slanting sides act as a guiding means whereby the edges of the fabric are turned up and in towards each other while the fabric is being drawn into the groove 21 and taking the shape of a letter U. As the fabric and wires pass over the pulley the edges of the fabric $b$ are stretched due to their being turned up by the beveled sides and being bent around the pulley and the tines of the folder. The stretching of the edges of the fabric permits the bead wires to be covered free from wrinkles or folding of the fabric at the edges. The folder and presser rolls are carried respectively by a vertical carriage 50 and an angularly arranged carriage 51, each sliding freely upon rods 52 suitably secured to the bracket 33 (cf. Figs. 1, 2, 3, and 4). Nuts 54 on the end of the rods secure in place crosspieces 55 which limit the outward movement of the carriages, while inward motion is limited by adjustable stops 56 which position the tools in proper relation to the pulley 23. Each carriage has attached to it the rod 57 of a piston 58 running in a pneumatic cylinder 59 which in turn is attached to the crosspiece 55. Cords 60 and 61 are attached to the carriages 50 and 51 respectively by eyes 62. Cord 61 runs over a pulley 63 on the crosspiece of the angularly moving carriage, while cord 60 runs over a pulley 64 on the vertical carriage and a pulley 65 on the angular carriage. At a point 66 beyond the latter pulley the cords are joined, an extension of one of them passing over a pulley 66 on the frame (Fig. 3) and having attached to it a weight 67. By this means the carriages are automatically returned to their outer or inactive positions upon the release of the air pressure in the pneumatic cylinders.

Vertical carriage 50 has an overhanging bracket upon which is secured a folder preferably of the design illustrated in Figs. 8 and 9. The forward end of the folder (that at the left in Figs. 2, 7, and 8) is bifurcated at 70, the two tines being curved downward to underlie the edges of the fabric strip $b$ and fit snugly in the recess 102 of pulley 23, whereby they turn the edges of the fabric upward. (See Figs. 6 and 7.) A groove 71 in the bottom of the folder acts as a continuation of the space between the folders, and permits the passage of the upturned fabric edges. The sides of the folder are beveled as at 72 to allow the folder to fit snugly into the groove in pulley 23.

After having been folded around the wire by the device just described the fabric covering on the wire is given a final pressing by a pair of rolls 75 rotatably secured in a block 76 on the bottom of the carriage 51. As best shown in Fig. 10, these rolls are mounted at an angle to each other and to the wire so as to exert a wiping as well as a pressing action upon the fabric. In Fig. 10 the wire is traveling away from the reader, and the drawing action of the rolls, as they are rotated by the passage of the fabric between them, is apparent. After the covered bead has passed these rolls the fabric is drawn smoothly and tightly around the wire into the condition illustrated in Fig. 11, with the edges of the rubberized fabric firmly pressed together into adhesive contact.

The fabric covering for the bead is supplied upon a spool 80, the mounting of which is best shown in Fig. 5. In a block 81 fixed to the carriage 30 is a shaft 82. Near the end of the shaft are holes 83 in which fit balls 84 pressed outwardly by small helical springs. The metal around the outer end of each hole is peened over after the ball and spring has been inserted so as to retain them in place. Over this end of the shaft a retaining disk 85 is adapted to slide, being held in place by the balls 84 snapping into a groove 86 in the bore of the disk. By this construction the fabric roll 80 may be quickly replenished when exhausted. To accommodate different widths of fabric stock the roll is backed up by a removable spacing collar 87, for which may be substituted collars of different thicknesses when the width of stock is changed. The retaining disk may also be replaced by another of different size if it is desired to align the fabric with entire accuracy.

In Fig. 12 a modification of the folding operation is shown which preserves certain but not all of the features of the invention. In this case the folder carried by vertical carriage 50 is designed so as to cause the edges of the fabric strip to overlap around the wire, and the rollers 75 on slide 51 are replaced by a single roller adapted to press the overlapped edges into firm adherence. Figs. 13 and 14 are illustrative of a second modification, in which the method described in my application Serial No. 673,084, filed November 6, 1923, Patent No. 1,585,900, dated May 25, 1926, is employed. According to this method two groups or cables of wires are used, spaced a little apart during the covering, so that a bridge 90 of fabric is formed which, when the bead is compressed to shape as in Fig. 14, forms the triangular body portion 91 of the completed bead filler. In this modification the pulley 23 is made wider, and has a central rib 92 serving to separate the two bead hoops and to give an initial crown to the fabric making easier the final shaping to triangular form. The folder of Fig. 8 is widened and shaped conformably with the changed type of the work. The rolls 75 may, however, be in this case left substantially as in Fig. 10.

Control of the rotation of pulley 23 is under the control of the operator by treadle 43. The separation of pulleys 22 and 23, and the positioning of the carriages 50 and 51 is preferably controlled by a single means. As shown, this is an air valve 95 of a standard construction used chiefly for air brake control. This valve is conveniently actuated by a foot lever 96, and operates either to admit compressed air from a supply pipe 97 to a pipe 98 connected by branches with the several air cylinders, or to permit the air from these cylinders to exhaust into a vent pipe 99. By a slight motion of the operator's foot the valve can be actuated to position the parts in either their active or inactive positions.

In operation the hoop of wire which is to be taped is first placed around the two pulleys while the latter are in the position of Fig. 2. In case the hoop is formed of a single length of wire coiled up several times with its ends joined it may be that the single coils have become irregular, and if so it is desirable to make them roughly uniform before placing the hoop in the machine. As an aid to this operation I have shown a hook or lug 100 (Fig. 1) over which the worker may loop the wire, pulling upon it manually until an approximate equalization has been brought about. The hoop is then in condition to be placed on the pulleys.

With the wire in place the air valve is actuated to cause separation of the pulleys and positioning of the carriages 50 and 51 adjacent the driving pulley. The fabric strip is then inserted between the wire and pulley 23, the flanged sides 101 of the pulley acting as guides. Clutch treadle 43 is then depressed causing the pulley 23 to rotate and draw the wire and fabric through the folding devices. The progressive folding of the fabric around the wire is indicated by the successive sections superposed on Fig. 6. The fabric gradually shapes itself in trough form, at first before it even contacts with pulley 23 and finally by the action of the inner surfaces of the tines 70 on the folder. The edges of the fabric are by this means turned outwardly around the wire, and pass together through the slot 71. On emerging from this slot the fabric edges encounter the rolls 75, which by their simultaneous drawing and pressing action cause the fabric to be permanently and tightly bound around the wire. When the leading end of the fabric has nearly completed the circuit of the pulleys the machine is stopped and the fabric severed from the supply. The machine may then be started again and run until the fabric has been completely applied to the wire. By a motion of the air valve the pulleys may now be brought closer together, and the folder and pressing wheels backed off, so that the completely covered wire cable may be removed from the machine.

Having thus described my invention, I claim:

1. In a device for covering rings with a strip of material; a pair of rolls around which the ring is stretched, one of said rolls having a grooved portion for the reception of the ring; and means for turning up and pressing together around the ring so as to form into a projecting lip the side portions of a strip of material inserted between the ring and the roll.

2. In a device for covering a pair of rings with a single strip of material; a pair of rolls around which the rings are stretched, and at least one of the rolls having spaced grooves and a projecting rib between the grooves to force outwardly a strip of material inserted between the rolls and the rings.

3. In a device for covering a pair of rings with a single strip of material; a pair of rolls around which the rings are stretched, said rolls each having spaced grooves to hold the rings in spaced relation and at least one of the rolls having a projecting rib between the grooves to force outwardly a strip of material inserted between the rolls and the rings; and means to fold around the wires the edge portions of such a strip; whereby a composite ring is formed having a pair of spaced rings united and enclosed by an outwardly curved bridging portion of material.

4. In a device for covering rings of wire with an adhesive strip material, a grooved pulley around which the wire passes, means for holding the wire tightly on the pulley, means to bring together around the wire the edges of a strip inserted between the wire and the pulley, and a pair of rolls set obliquely to the plane of the pulley and converging along the line of travel of the wire to draw the strip tightly around the wire and press its edges together.

5. In a device for covering rings of wire with an adhesive strip material, a grooved pulley around which the wire passes, a second pulley, a strip supply adapted to supply strip material between the first pulley and the wire, folding devices movably arranged adjacent the first pulley, and means operable to cause separation of the pulleys to hold the wire taut and simultaneously therewith to cause the folding devices to shift from an inactive position spaced from the first pulley to an operative position in close adjacency thereto.

6. In a device for covering rings of wire with an adhesive strip material, a grooved pulley around which the wire passes, means for holding the wire tightly on the pulley, a strip supply adapted to supply strip material between the pulley and the wire, a folder arranged adjacent the pulley and adapted to bring the edges of the strip together around the wire, and a pair of rolls set obliquely to the plane of the pulley and converging along the line of travel of the wire to draw the strip tightly around the wire and press its edges together.

7. In a device for covering rings of wire with an adhesive strip material, a grooved pulley around which the wire passes, means for holding the wire tightly on the pulley, a strip supply adapted to supply strip material between the pulley and the wire; a pointed forked folder arranged adjacent the pulley, said pulley being grooved to allow the points of the forked folder to lie in the groove and under the edges of the strip and said folder being adapted to bring the edges of the strip together around the wire, and a pair of rolls set obliquely to the plane of the pulley and converging along the line of travel of the wire to draw the strip tightly around the wire and press its edges together.

8. In a device for covering rings of wire with an adhesive strip material, a grooved pulley around which the wire passes, means for holding the wire tightly on the pulley, a strip supply adapted to supply strip material between the pulley and the wire, a folder arranged adjacent the pulley, said pulley and folder cooperating to stretch the edges of the strip and bring them together around the wire, and a pair of rolls set obliquely to the plane of the pulley and converging along the line of travel of the wire to draw the strip tightly around the wire and press its edges together.

9. A device of the character described comprising means to support grommets in spaced relation and means to fold a strip of material between and around the grommets.

10. A device of the character described comprising means to support grommets in spaced parallel relation and means to fold a strip of material between and around the grommets.

11. A device of the character described comprising means to support grommets in spaced relation, means to fold an intermediate portion of a strip of material between the grommets and means to fold the edges of the strip about the adjacent grommets.

12. A device of the character described comprising means to support grommets in spaced relation, means to fold the intermediate portion of a strip of material between the grommets and means to fold the edges of the strip around the adjacent grommets and into overlapping relation with the central fold.

13. A device of the character described comprising means to support a plurality of strands of bead core material in spaced relation and means to fold a strip of filler material between and around the strands.

14. A device of the character described comprising means to support a plurality of strands of bead core material in spaced relation, means to fold an intermediate portion of a strip of filler material between the bead cores and means to fold the edges of the strip about the adjacent strands.

15. A device of the character described comprising a roll with a central flange and means to feed a pair of grommets over said roll, a grommet passing on each side of the flange.

16. A device of the character described comprising a roll provided with spaced grooves adapted to receive grommets and means to position a strip of material in underlying relation to the grommets as they pass over the roll.

17. A device of the character described comprising a roll provided with spaced grooves adapted to receive grommets and a flanged roll, adjacent the grooved roll, the flange of which passes between the grommets.

CHARLES H. DESAUTELS.